(12) United States Patent
Segev et al.

(10) Patent No.: US 9,749,958 B1
(45) Date of Patent: Aug. 29, 2017

(54) LOW POWER SIGNALING USING A WAKE-UP RECEIVER

(71) Applicant: Intel Corporation, Santa Clara, CA (US)

(72) Inventors: Jonathan Segev, Tel Mond (IL); Minyoung Park, Portland, OR (US); Shahrnaz Azizi, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/088,343

(22) Filed: Apr. 1, 2016

(51) Int. Cl.
*H04B 1/38* (2015.01)
*H04W 52/02* (2009.01)
*H04L 25/03* (2006.01)

(52) U.S. Cl.
CPC ... *H04W 52/0235* (2013.01); *H04W 52/0222* (2013.01); *H04L 2025/03375* (2013.01)

(58) Field of Classification Search
USPC .......................................................... 455/574
See application file for complete search history.

(56) References Cited

U.S. PATENT DOCUMENTS

2016/0021612 A1*  1/2016  Matsunaga ....... H04W 74/0816
                                                            370/311

* cited by examiner

*Primary Examiner* — Joel Ajayi
(74) *Attorney, Agent, or Firm* — Eversheds Sutherland (US) LLP

(57) ABSTRACT

This disclosure describes methods, apparatus, and systems related to low power signaling. A device may identify a service request to establish a service with a first device. The device may extract information from the service request. The device may generate a wake-up packet based at least in part on the extracted information. The device may cause to send the wake-up packet to a second device.

21 Claims, 8 Drawing Sheets

LOW POWER SIGNALING USING A WAKE-UP RECEIVER

TECHNICAL FIELD

This disclosure generally relates to systems and methods for wireless communications and, more particularly, to low power signaling using a wake-up receiver.

BACKGROUND

Advances in wireless communications require the use of efficient batteries to allow devices longer times between recharges or replacement. The exchange of data in wireless communications consumes power and having repeated recharges or installation of dedicated power lines may result in relatively negative user experience.

DETAILED DESCRIPTION

Figure 1:
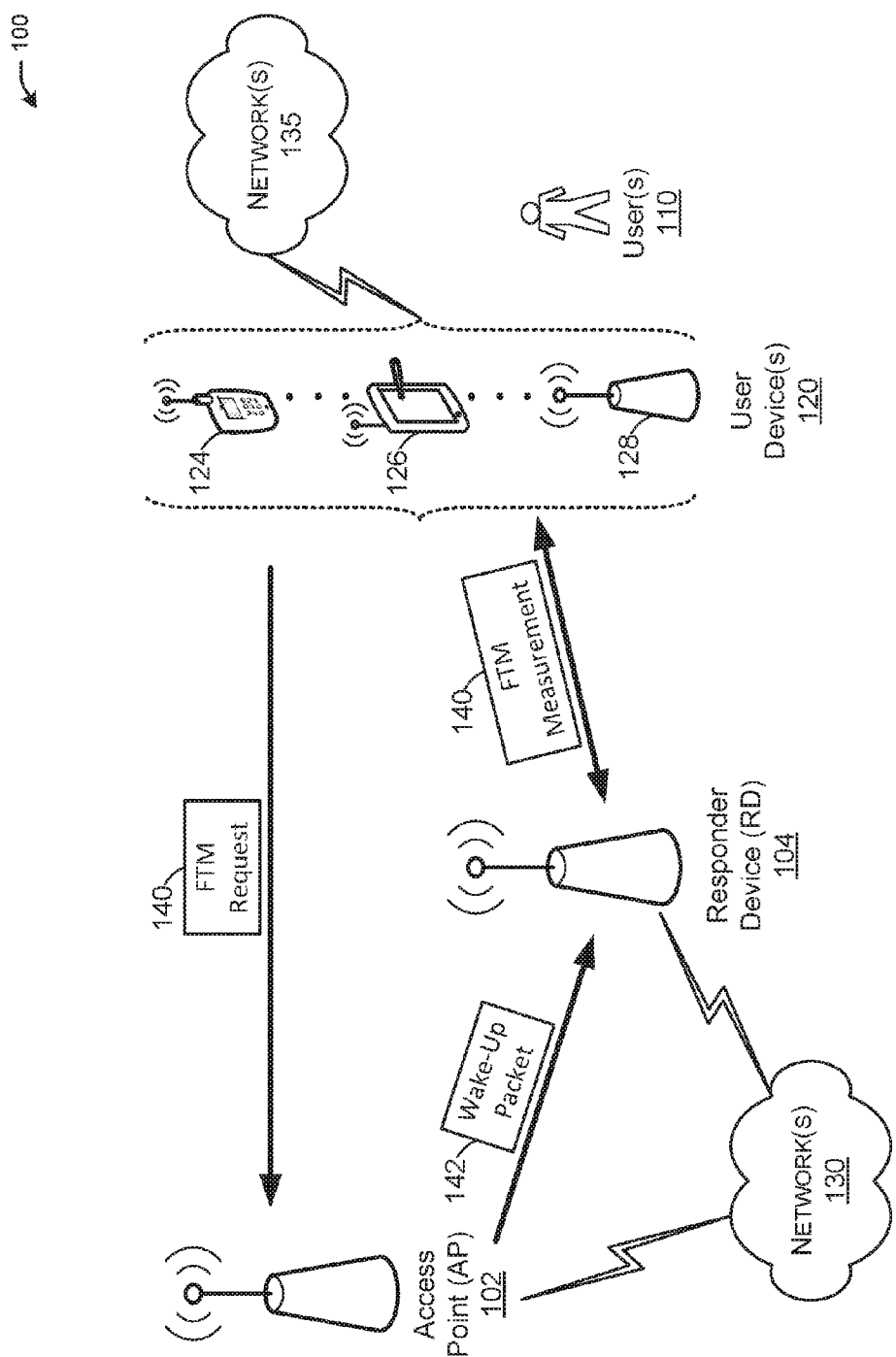
FIG. 1 depicts a network diagram illustrating an example network environment of low power signaling, according to one or more example embodiments of the disclosure.

Example embodiments described herein provide certain systems, methods, and devices, for providing low power signaling between Wi-Fi devices in various Wi-Fi networks, including, but not limited to, IEEE 802.11 family of standards.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Wi-Fi devices that operate as a central station or as another device that may be used to perform measurements. Central stations or other devices, may be referred to throughout this disclosure as responding devices or governing devices based on their use. A responding device may be an access point, and FTM responder, a relay device, an ad hoc AP, a neighbor awareness networking (NAN) device with NAN anchor role, etc. A governing device may be a device capable of communicating with other devices in order to complete a request for a service. A governing device may be an AP or another user device established as an anchor device (e.g., utilizing Wi-Fi direct and/or Wi-Fi Aware techniques).

These Wi-Fi devices may be configured to receive service requests from user devices that may be associated (or in some scenarios unassociated) with other Wi-Fi devices. In order for these Wi-Fi devices to operate, either a dedicated power line may be installed or the Wi-Fi devices may operate using batteries (rechargeable or disposable). In case the Wi-Fi devices operate using batteries, user interaction is needed to ensure proper charge is maintained on the batteries. For example, a user must replace disposable batteries when their charge is below a threshold necessary to operate the Wi-Fi device. Another example, when rechargeable batteries are used, a user must recharge the batteries when their charge is below the threshold. In case the devices operate using a dedicated power line, additional installation complication may be introduced when new devices are added to the wireless network. For example, a household or business Wi-Fi network may be comprised of one or more Wi-Fi devices, including but not limited to, an access point, one or more user devices such as laptops, tablets, printers, mobile phones, etc. Additional access points may need to be added to the Wi-Fi network. The additional access points may present installation complication, such as running new cables (e.g., Ethernet cables and/or power cables).

An example of a service request may be a request to perform a fine timing measurement (FTM) procedure to perform range measurement. A location of a user device may be determined based at least in part on various measurements with respect to other devices in the range of the user device. The user device may utilize the FTM procedure to obtain its range to another device, such as an access point, an FTM responder, or another user device established as an anchor device (e.g., utilizing Wi-Fi direct and/or Wi-Fi Aware techniques). The FTM procedure is an IEEE 802.11 protocol introduced to support location determination based on range measurement to multiple known responding devices (e.g., an AP, a Wi-Fi Aware STA, a SoftAP and/or an FTM responder) and execution of location determination techniques, for example, triangulation, trilateration, multi-lateration, etc. The existing FTM protocols uses time of flight (TOF), which relies on the responding device transmitting one or more fine timing measurement frames during a negotiated time window called a burst. These time windows have a known duration and interval. The FTM procedure may determine the location of a user device (also known as an initiating device in the context of the FTM procedure) based on time differences between various FTM frames sent and received between a responding device and the initiating device during a burst duration that may be determined by the FTM procedure. The burst duration may be a duration of each burst instance starting at the boundary of a burst period. That is, the burst duration may be a time duration within which one or more FTM frames may be sent to the initiating device. The burst period may be an interval from the beginning of one burst instance to the beginning of the following burst instance. For example, a responding device may utilize FTM frames to perform time measurements within the burst duration in order to determine the location of an initiating device.

The initiating device may simultaneously or at different times initiate a number of FTM sessions with multiple responding devices. The multiple responding devices may be operating at different channels and may not be synchronized with each other in order to minimize collisions. Consequently, the initiating device may have more than one ongoing FTM procedure instance at any given time as well as other activities asynchronous in nature to the FTM procedure on other channels.

Example embodiments of the present disclosure relate to systems, methods, and devices for a low power signaling to support power conscious devices that are required to remain on minimal power consumption for long durations. These devices may be able to have a short latency in response to incoming request for service, which occurs at infrequent occasions. Some examples of such devices may be FTM responders, ad hoc APs, SoftAPs, devices in MESH network, or user devices that are designated as anchor devices in a Wi-Fi NAN cluster. An FTM responder may be a device that provides FTM measurements to a device requesting an FTM service. The FTM responder may be used to enhance a Wi-Fi network's ability to provide better location accuracy. For example, in cases where user devices require a minimum of three APs to perform trilateration, but channel conditions render these measurements less accurate (e.g., due to multipath, reflections and other limitations). In this case, the channel conditions may be considered as a limiting factor for accurate location determination. The FTM responder may replace the use of an AP in order to perform FTM measurements without having the additional tasks that an AP may have (e.g., accessing the Internet, user management, accessing other devices on the network, etc.). An ad hoc AP may be employed to perform a particular purpose or function (e.g., FTM measurements) or may be utilized as a relay AP. The ad hoc AP may be battery operated in order to eliminate additional installation and wiring. The ad hoc AP may power itself on based on receiving a wake-up packet delegated from a governing device based on medium conditions, such as, level of interference, medium usage, signal-to-noise ratio (SNR), power consumption, etc. The ad hoc AP may either have a backhaul providing connectivity to the internet or act as a relay device that act as an intermediary between the AP and the user device.

In one embodiment, a responding device may be a device capable of delegating some of its activities to another device. The other device may utilize an LP-WUR in order to communicate with the responding device to transition the responding device between a low power mode and a high power mode based on a wake-up message sent to the responding device from the other device. For example, two devices may be able to service a user device such that the user device may be able to send a service request to one of these two devices. In some embodiments, the first device may delegate handling the service request to the second device. The first device may then transition to a low power mode, such as a dormant state or powering off one or more of its circuitry. The user device may be unaware of the delegation and may continue to communicate using the same MAC address as the first device. The second device may be transparent to the user device. The first device may be in a low power mode, until the second device sends a wake-up message to transition the first device to a high power mode, such as active state or powering on the one or more of its circuitry. In this example, the first device may be referred to as the responding device and the second device may be referred to as a governing device. The first device and the second device may intermittently delegate activity from one to the other such that they both save on power. That is, the first device may go into the role of the low power mode device while the second device becomes the governing device and vice versa. Such a balance of power consumption may be maintained between multiple devices and not limited to only two devices. It is understood that the above descriptions are for purposes of illustration and are not meant to be limiting.

In some embodiments, a determination is made between the first device and the second device to determine which one should be the governing device and which one is the dormant device. This determination may be based on medium conditions, such as, level of interference, medium usage, signal-to-noise ratio (SNR), power consumption of the first device and the second device, etc. For example, if the first device power consumption is too high and battery life is low, the first device may then delegate some of its activities to the second device, which may be in a better power consumption mode. In that sense, the first device preserves its power since it only communicates using a low power receiver and only transitions from a low power mode to a high power mode when it receives a wake-up packet from the second device. In one embodiment, the power conscious devices, such as an FTM responder or an Ad hoc AP, may include an LP-WUR device. The governing device for a duration of time, may be delegated or delegate the activities of the device in sleep mode. For example, the governing device may designate an ad hoc AP or an FTM responder to communicate with the user device based on various criteria, such as a channel selection, power consumption status, medium conditions and signal attributes, the sector the signal was received from, or a range to that user device. The governing device may assign the ad hoc AP or the FTM responder (or another user device) to act as an intermediary between the governing device and the user device. A governing device may receive a request from a user device to associate with the governing device. The ad hoc AP or the FTM responder may act as an intermediary in a manner that is transparent to the user device requesting the service. For example, the ad hoc AP or the FTM responder may use the same (or an assigned) MAC address of the governing device, such that, the user device is unaware it was moved to another device.

Lower energy consumption may be achieved by adding a low-power wake-up receiver (LP-WUR) to a Wi-Fi device, such as an ad hoc AP or a responder device. The addition, the LP-WUR may be utilized in a scenario such as adding additional Wi-Fi devices to an existing Wi-Fi network. In such a case, it may be beneficial to minimize the recharging frequency of the Wi-Fi device's battery by lowering its energy consumption. The additional Wi-Fi devices with low energy consumption may be easier to deploy and/or implement in the Wi-Fi network, since it does not require dedicated power wires and/or Ethernet cables.

A strategy to minimize the energy consumption of a device may be to power off one or more communications components (e.g., radio device, radio circuitry or radio system) while maintaining data transmission and reception without increasing latency. For instance, a device may power on the one or more communications components based on the reception of a wake-up packet. The wake-up packet may indicate that the device may wake-up before processing upcoming communications, and power off for the rest of the time.

In one embodiment, an LP-WUR may be used in devices that act as relay devices for user devices requesting non-FTM services. For example, non-FTM services may include, but not limited to, data traffic services. an LP-WUR may be used in a relay device to transition into active or inactive mode, such as, powering one or more components of its circuitry on, only when needed and powering off during other times. During the active mode, the relay device may relay the data communication traffic to the governing device, while maintaining transparency with the user device requesting the data traffic service. When used for data traffic services the link conditions between governing device and the relay device may be known and static. In that case, the user device may be steered to use the relay device with better link budget than that of the governing device. It is understood that a link budget is the aggregations of all the gains and losses from the transmitter, through the medium (free space, cable, waveguide, fiber, etc.) to the receiver in a telecommunication system.

In one embodiment, an FTM responder may include an LP-WUR in order to improve the power consumption by the FTM responder. For example, a user device may request an FTM session such that an FTM procedure may send one or more FTM frames to the user device in order to determine a range of the user device relative to at least the FTM responder based on timing measurements of the one or more FTM frames. Subsequently, location determination techniques, for example, triangulation, trilateration, etc., may be utilized based on the results of the FTM procedure in order to determine the location of the user device.

In one embodiment, utilizing a wake-up packet may allow the FTM procedure (or a data traffic service) to move from sending data (sending data messages) to signaling (e.g., sending a wake-up packet). This may further provide advantages because signals may be processed by a low power receiver (e.g., LP-WUR) as opposed to the high power receiver.

In one embodiment, and utilizing an FTM service as an example, the user device may send an FTM request message to the governing device in order to establish the FTM session. The governing device may extract FTM parameters from the FTM request message. The FTM parameters may include, but not limited to, a burst time, a burst period, and identification information associated with the user device. The governing device may then utilize a low power wake-up transmitter within the governing device to send the FTM parameters to the FTM responder (or the ad hoc AP) using, for example, on-off keying (OOK) modulated frame (e.g., a wake-up frame or packet). Although OOK is discussed, other modulation techniques may be used, such as, amplitude shift keying (ASK) or frequency shift keying (FSK). In some examples, the wake-up packet may include timing information associated with the FTM session. For example, the wake-up packet may include a time when an FTM frame may be sent and/or received by the initiating device. In other examples, the wake-up packet may include an agreed and expected periodic reception of additional wake-up packets. Other timing information may include a time when the FTM responder may need to transition to an active or inactive mode (e.g., powering on or off one or more components in the FTM responder or the ad hoc AP).

In one embodiment, the LP-WUR in the FTM responder (or the ad hoc AP) may receive the wake-up packet from the governing device. The LP-WUR integrated in the circuitry of the FTM responder (or the ad hoc AP) may be configured to receive the wake-up packet as an indication that the radio system of the FTM responder (or ad hoc AP) may need to be powered on in order to start receiving/sending data associated with the service request (e.g., FTM service request). The LP-WUR may be characterized with a much lower power consumption compared to a normal IEEE 802.11 OFDM receiver (e.g., IEEE 802.11 receiver). The governing device may include a wake-up packet transmitter that generates a wake-up packet to be transmitted to the FTM responder (or the ad hoc AP) during the FTM procedure, or other services.

In one embodiment, after receiving the wake-up packet, the LP-WUR may generate a wake-up signal to be sent to the one or more components that are in an active or dormant mode (e.g., powered off) on the FTM responder (or the ad hoc AP). The one or more inactive components may move from inactive to active mode by being powered on based on receiving the wake-up signal. Subsequently, the FTM responder (or ad hoc AP) may send an FTM assignment (or service establishment) and start the FTM process by sending the one or more FTM frames in the active mode.

One or more advantages of utilizing an LP-WUR device in an FTM responder or the ad hoc AP, may include, but not limited to, a transparency to user devices. For example, the user device may be unaware that the FTM responder is completing its FTM service request or any other service request. Further, the use of the an LP-WUR device may allow the FTM responder to be backward compatible with user devices that are already in the market because the user device may be unaware of the LP-WUR interaction between the governing device and the FTM responder or the ad hoc AP.

Another advantage may include improved and efficient battery usage of the FTM responder (or ad hoc AP). For example, an FTM responder may only be operational (e.g., in an active mode or powered on mode) when service is needed and requested by a user device. Consequently, the FTM responder may be fully operational in order to complete the service request with the user device. Otherwise, the FTM responder may operate on a fraction of the power since some of its components may be in an inactive mode when not needed.

Another advantage may include enhanced spectral density when using the FTM responder or ad hoc AP as a relay device for data traffic services. Spectral density may refer to the link conditions between the governing device and the relay device, where the link conditions are known to the user device. The channel conditions may be better from the user device to the relay device than to the governing device.

Another advantage may include lowering the co-channel and adjacent channel interference because of reduced transmission power. Doing so may further improve medium usage in interference limited environments.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 is a network diagram illustrating an example network environment, according to some example embodiments of the present disclosure. Wireless network 100 may include one or more user devices 120, one or more access points (APs) 102, and one or more responding device(s) (RDs) 104, which may communicate in accordance with IEEE 802.11 communication standards. The user device(s) 120 may be mobile devices that are non-stationary (e.g., not having fixed locations) or may be stationary devices. Although in the example of FIG. 1, an AP 102 and an RD 104 are shown, it is understood that the AP 102 may a device other than an access point. For example, the AP 102 may be any device that may receive a service request, such as, another user device that may utilize Wi-Fi Aware techniques for servicing other user devices. Further, the AP 102 may be an FTM responder or an ad hoc AP, or any other devices. Similarly, the RD 104 may be an access point, a user device, or an FTM responder, etc. In some embodiments, the AP 102 may take the role of the RD 104 and vice versa based on power consumption determination between the AP 102 and the RD 104.

In one embodiment, a device (e.g., RD 104) may be a device capable of delegating some of its activities to another device (e.g., AP 102). The other device (e.g., AP 102) may utilize a low power transmitter to communicate with the RD 104 to transition the RD 104 between a low power mode and a high power mode based on a wake-up message sent to the RD 104 from the AP 102. For example, AP 102 and RD 104 may be able to service a user device 120 such that the user device 120 may be able to send a service request to either one of these two devices. For example, in the case the user device 120 sends the service request to the RD 104, the RD 104 may delegate handling the service request to the AP 102. The RD 104 may then transition to a low power mode, such as, a dormant state or powering off one or more of its circuitry. The user device 120 may be unaware of the delegation and may continue to communicate using the same MAC address as the RD 104. The AP 102 may be transparent to the user device. The RD 104 may be in a low power mode, until the AP 102 sends a wake-up message to transition the RD 104 to a high power mode, such as active state or powering on the one or more of its circuitry. In this example, the RD 104 may be referred to as the responding device and the AP 102 may be referred to as a governing device. The RD 104 and the AP 102 may intermittently delegate activity from one to the other such that they both save power. That is, the RD 104 may go into the role of the low power mode device while the AP 102 becomes the governing device and vice versa. For example, a power consumption status may be determined for each of the AP 102 and/or the RD 104, or other devices. The power consumption status may indicate whether a device is capable of maintaining a predetermined operating power level. The power consumption status may indicate whether a device has enough power reserve in order to operate and complete the service request received from a user device 120. The predetermined operating power level may be used as a threshold for determining whether a device falls below or above that threshold. For example, if the power consumption status of the AP 102 is below the threshold, while the power consumption status of the RD 104 is above the threshold, it may be determined that the RD 104 should act as the governing device and the AP 102 should act as the responding device. In that case, the AP 102 will transition from high power to low-power and vice versa based on a wake-up package received from the governing device (in this case, the RD 104). Such a balance of power consumption may be maintained between multiple devices and not limited to only two devices. It is understood that the above descriptions are for purposes of illustration and are not meant to be limiting.

Figure 6:
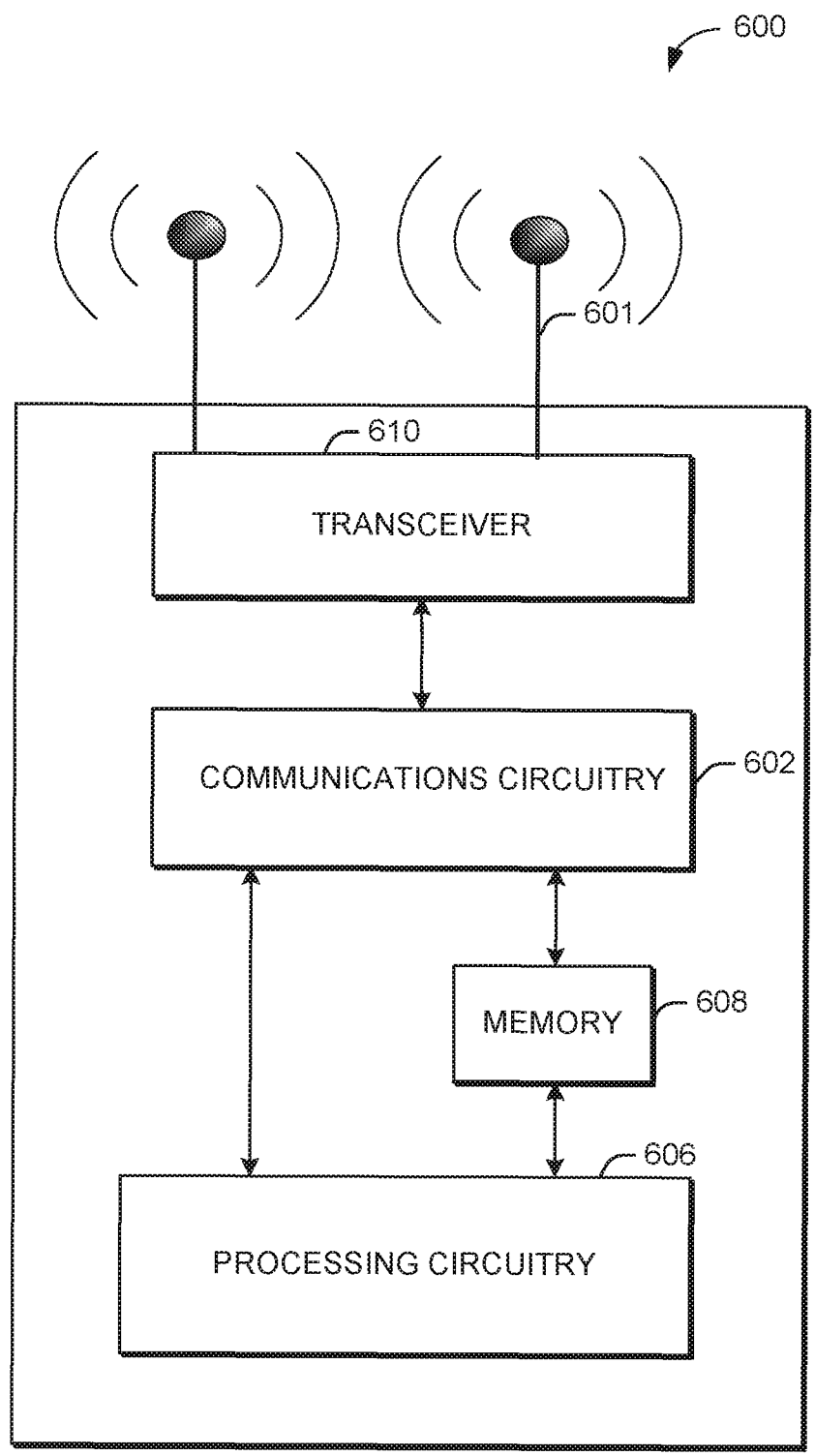
FIG. 6 illustrates a functional diagram of an example communication station that may be suitable for use as a user device, in accordance with one or more example embodiments of the present disclosure.
Figure 7:
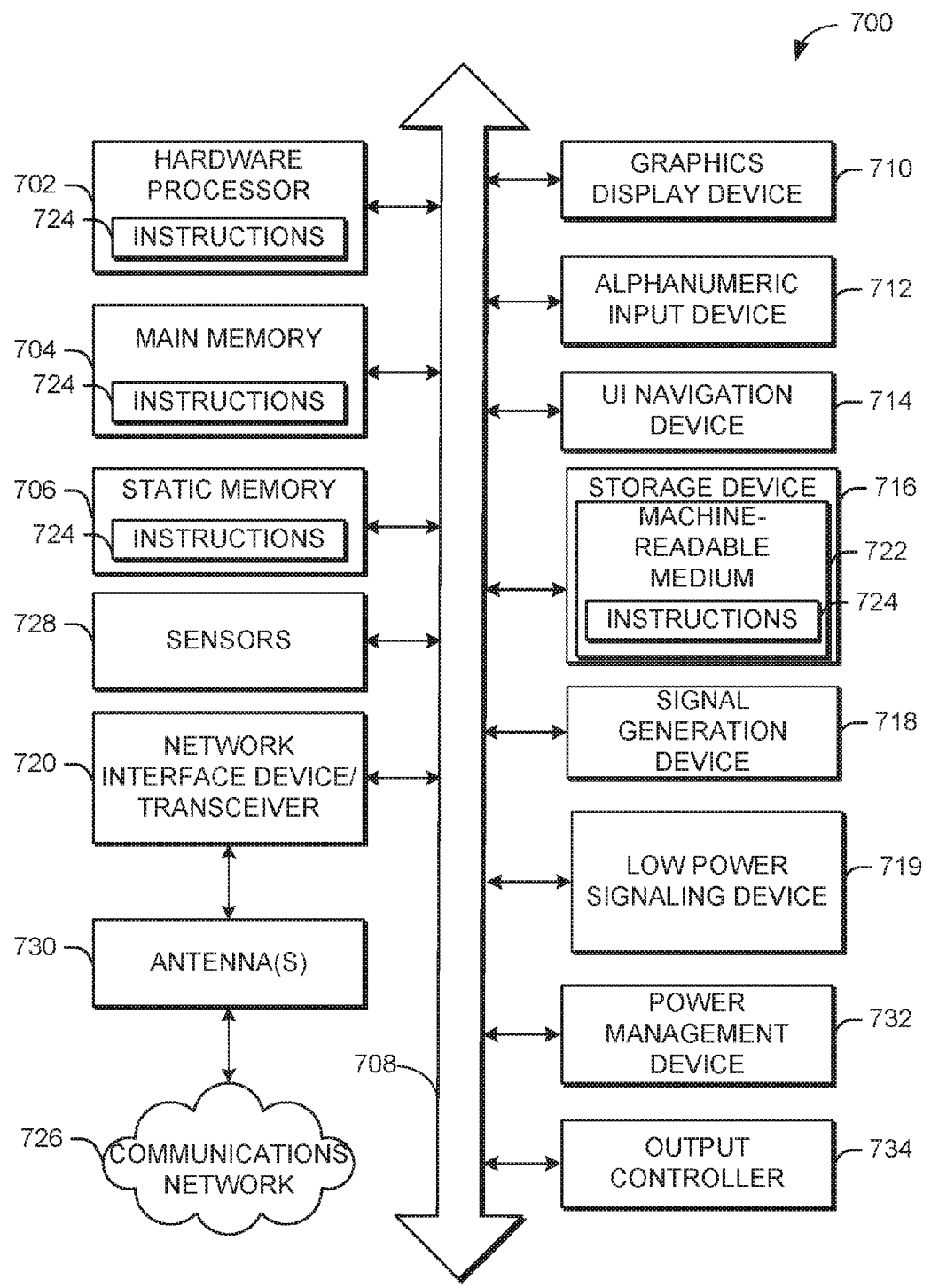
FIG. 7 is a block diagram of an example machine upon which any of one or more techniques (e.g., methods) may be performed, in accordance with one or more example embodiments of the present disclosure.

In some embodiments, the user devices 120, the AP 102, and the RD 104 may include one or more computer systems similar to that of the functional diagram of FIG. 6 and/or the example machine/system of FIG. 7.

One or more illustrative user device(s) 120, AP 102, and/or RD 104 may be operable by one or more user(s) 110. The user device(s) 120 (e.g., 124, 126, or 128), AP 102, and/or RD 104 may include any suitable processor-driven device including, but not limited to, a mobile device or a non-mobile, (e.g., a static device). For example, user device(s) 120, AP 102, and/or RD 104 may include a user equipment (UE), a station (STA), an access point (AP), an fine timing measurement (FTM) responder, a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like.

Any of the user device(s) 120 (e.g., user devices 124, 126, 128), AP 102, and RD 102 may be configured to communicate with each other via one or more communications networks 130 and/or 135 wirelessly or wired. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), AP 102, and RD 104 may include one or more communications antennae. Communications antenna may be any suitable type of antenna corresponding to the communications protocols used by the user device(s) 120 (e.g., user devices 124, 126 and 128), AP 102, and RD 104. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user devices 120.

Any of the user devices 120 (e.g., user devices 124, 126, 128), AP 102, and RD 102 may include any suitable radio and/or transceiver for transmitting and/or receiving radio frequency (RF) signals in the bandwidth and/or channels corresponding to the communications protocols utilized by any of the user device(s) 120, AP 102, and RD 104 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

With reference to FIG. 1, one or more user devices 120 (e.g., user devices 124, 126 and/or 128) may wish to request a service from the AP 102. The AP 102 may act as a governing device responsible for a plurality of functions in accordance with IEEE 802.11 standards. The requested service may include, but not limited to, a data traffic service, a fine timing measurement (FTM) service, etc. In the example of FIG. 1, an FTM service request and FTM measurement is utilized for illustrative purposes only and not as a limitation. Other services may employ any or all of the embodiments of the present disclosure.

In an illustrative example, the user device 124 may send an FTM request 140 to establish an FTM session with the AP 102. The FTM procedure may include sending one or more FTM frames to the user device 124 in order to determine a range of the user device 124 relative to at least the FTM responder (e.g., RD 104 or AP 102) based on timing measurements of the one or more FTM frames. Subsequently, location determination techniques, for example, triangulation, trilateration, etc., may be utilized based on the results of the FTM procedure in order to determine the location of the user device.

In one embodiment, the AP 102 may receive the FTM request 140 and may extract FTM related information, such as, FTM parameters, including, but not limited to, burst time, burst period, and identification information associated with the user device 124.

In one embodiment, the RD 104 may include a low-power wake-up receiver (LP-WUR) device in order to improve the power consumption by the RD 104. The LP-WUR in the RD 104 may receive the wake-up 142 packet from the AP 102.

The LP-WUR integrated in the circuitry of the RD 104 may be configured to receive the wake-up 142 packet as an indication that the radio system of the RD 104 may need to be powered on in order to start receiving/sending data associated with the service request (e.g., FTM service). The LP-WUR may be characterized with a much lower power consumption compared to a normal IEEE 802.11 OFDM receiver (e.g., IEEE 802.11 receiver). The AP 102 may include a wake-up packet transmitter that generates a wake-up packet to be transmitted to the RD 104.

In one embodiment, after receiving the wake-up packet, the LP-WUR in the RD 104 may generate a wake-up signal to be sent to the one or more dormant components on the RD 104. The one or more dormant components may move from dormant to active mode. Afterwards, the RD 104 may send an FTM assignment and start the FTM process by sending the one or more FTM frames in the active mode to the user device 124.

Figure 2:
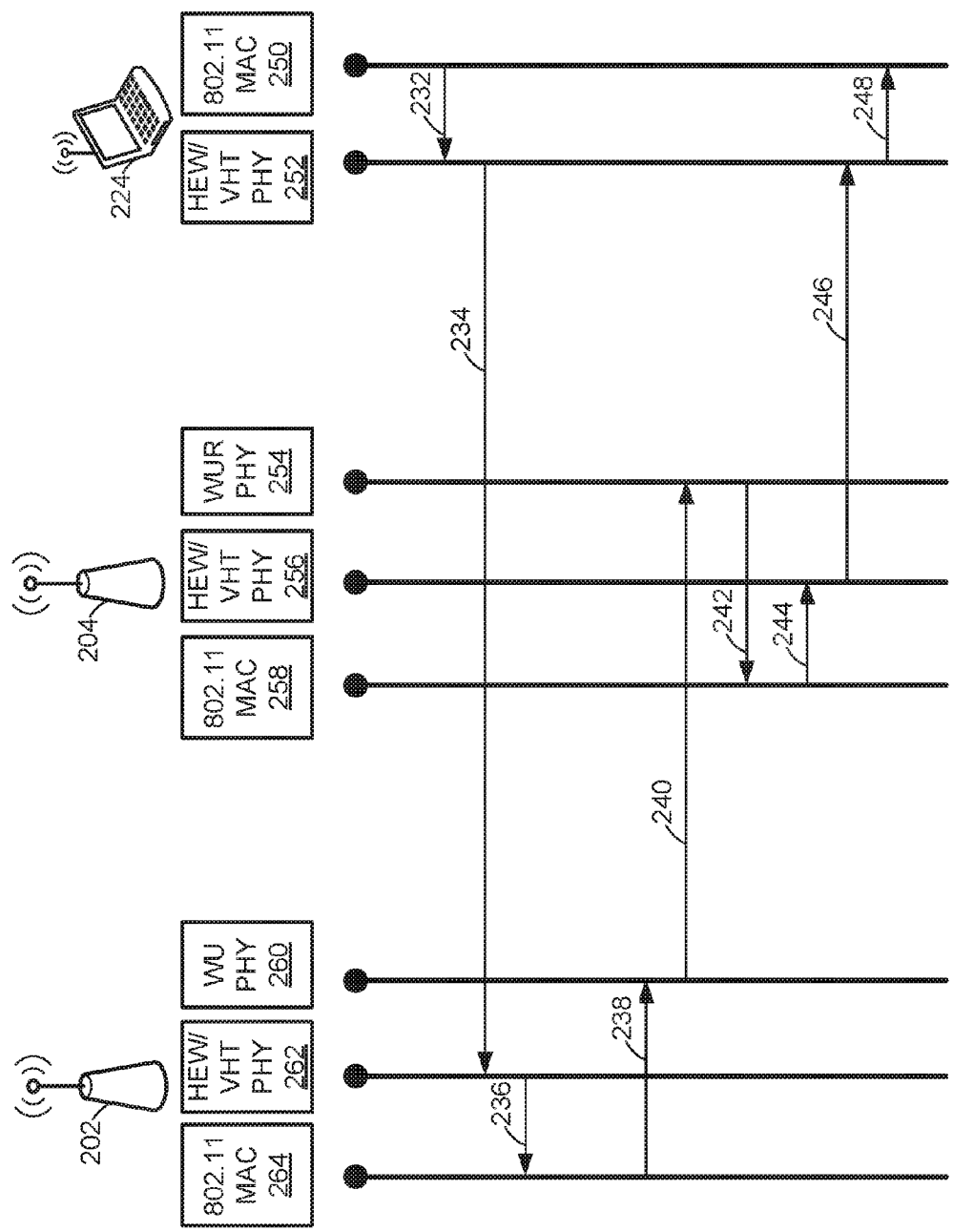
FIG. 2 depicts a message flow diagram for low power signaling, in accordance with one or more example embodiments of the present disclosure.

FIG. 2 depicts an illustrative message flow for low power signaling, in accordance with one or more example embodiments of the present disclosure.

Referring to FIG. 2, there is shown an AP 202, an RD 204 and a user device 224. For illustration purposes only, an example of FTM procedure is provided.

The user device 224 may wish to perform range measurement using an FTM procedure. The user device 224 may start the process by internal communication between the MAC layer 250 and the PHY layer 252, in accordance with one or more IEEE 802.11 standards, including IEEE 802.11ax and IEEE 802.11ac or other IEEE 802.11 standards. For example, the MAC layer 250 may generate an internal message 232 to inform the PHY layer 252 that an FTM service is to be requested. The PHY layer 252 of the user device 224 may extract information from the internal message, such as, destination information, origination information, network ID, etc. An FTM service request 234 may be generated by the PHY layer 252 of the user device 224 and sent to the AP 202 in order to notify the AP 202 of the FTM service request. The AP 202 may include, at least in part, a PHY layer 262, a MAC layer 264, and a lower power wake-up PHY layer 260. The PHY layer 262 of the AP 202 may receive the FTM service request 234 and may extract information associated with the user device 224 and the requested FTM service. For example, some of the information may include, but not limited to, FTM parameters, such as, burst time, burst period, and identification information associated with the user device 224.

The PHY layer 262 of the AP 202 may communicate internally with the MAC layer of the AP 202 using message 236 in order to process the FTM service request received from the user device 224. The message 236 may include, at least in part, the FTM parameters. In turn, the MAC layer 264 may generate a message 238 to notify the low power wake-up PHY layer 262 of the FTM service request. The message 238 may include, at least in part, the FTM parameters. The message 238 may indicate to the low power wake-up PHY 260 layer that a wake-up message 240 may need to be generated. The low power wake-up PHY 260 layer may generate a wake-up message 240, such that the wake-up message 240 may include, at least in part, the FTM parameters that were extracted from the FTM request 234. The wake-up message 240 may be sent by the low power wake-up PHY 260. The wake-up message 240 may be an OOK modulate frame, using OOK modulation or may be a frame using ASK or PSK modulation. The wake-up message 240 may be received by the low power wake-up receiver PHY layer 254 of the RD 204. The RD 204 may have been in a dormant mode, where at least some of its components are powered off. For example, its IEEE 802.11 radio circuitry may be powered off. When the wake-up message is received by the low power wake-up receiver PHY layer 254, the low power wake-up receiver PHY layer 254 may generate a signal or internal message to instruct at least some of the components of the RD 204 to transition from the dormant mode to an active mode. Consequently, the RD 204 may then move from dormant to active mode. Internal message 242 may be sent to from the PHY layer 254 to the MAC layer 258 of the RD 204. Internal message 244 may be sent from the MAC layer 258 to the PHY layer 256. The RD 204 may then generate an FTM message 246 at the PHY layer 256 and may send the FTM message 246 to the user device 224. The FTM message 246 may be an FTM assignment message that is meant to start the FTM frame exchanges with the user device 224 in order to perform the FTM procedure. The FTM message 246 may be based at least in part on the FTM parameters that were extracted from the FTM request 234. The FTM message 246 may be received by the PHY layer 252 of the user device 224 and may be internally sent to the MAC layer 250 using internal message 248 in order to indicate to the user device 224 that a response to the FTM request 234 is received. The FTM procedure may then be performed between the user device 224 and the RD 204, even though the initial FTM request 234 was sent to the AP 202. The RD 204 may act as an intermediary in a manner that is transparent to the user device 224 requesting the service. For example, the ad hoc AP or the FTM responder (e.g., RD 204) may use the same (or an assigned) MAC address of the AP 202, such that, the user device 224 is unaware it was moved to another device (e.g., RD 204).

Figure 3:
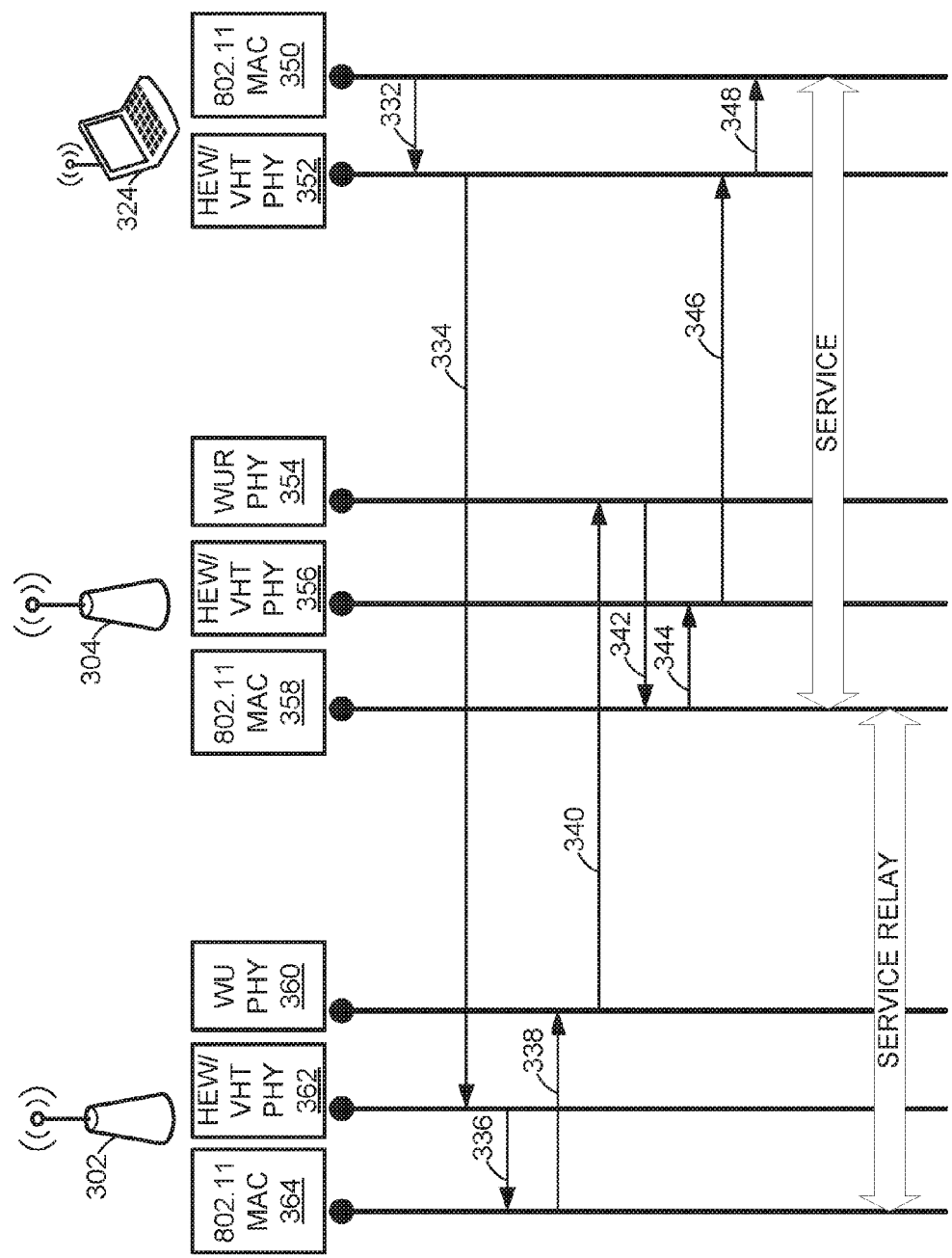
FIG. 3 depicts a message flow diagram for low power signaling, in accordance with one or more example embodiments of the present disclosure.

FIG. 3 depicts an illustrative message flow for low power signaling, in accordance with one or more example embodiments of the present disclosure.

With reference to FIG. 3, there is shown an AP 302, a relay device 304 and a user device 324.

In one embodiment, an LP-WUR may be used in devices, such as the relay device 304, which acts as a relay device between the user device 324 and the AP 302. For example, services, such as, data traffic services may be used by the relay device 304 that may enter an active mode, such as, powering one or more components of its circuitry, only when needed. This may occur based on a wake-up message that may be received. The wake-up message may include an indication for the LP-WUR on the relay device 304 to wake-up one or more components of its circuitry. During the active mode time, the relay device may relay the data communication traffic to the governing device. When used for data traffic services the link conditions between governing device and the relay device may be known and static. In that case, the user device may be steered to use the relay device with better link budget than that of the governing device. It is understood that a link budget is the aggregations of all the gains and losses from the transmitter, through the medium (free space, cable, waveguide, fiber, etc.) to the receiver in a telecommunication system.

In one embodiment, during the low power state, the governing device may receive a packet, which might be large. For example, the packet may be larger than a predetermined packet size. The predetermined packet size may be based at least in part on spectral efficiency and/or or the medium. For example, if a packet size is too large to be efficiently transmitted using a low power transmitter, the packet may be sent using another transmitter on the governing device. The governing device may send the wake-up packet to the relay device. The wake-up packet may indicate to the relay device that one or more of its circuitry need to transition from a low power mode to a high power mode. For example, the wake-up packet may indicate, at least in part, that the radio circuitry should power up in order to start communicating with the governing device and/or the user device. After the relay device is in a high power mode, the governing device may send the received packet that was determined to be larger than the predetermined packet size, to the relay device using a high power transmitter as opposed to the low power transmitter. The user device 324 may wish to perform a data service with the AP 302. The user device 324 may start the process by internal communication between the MAC layer 350 and the PHY layer 352, in accordance with one or more IEEE 802.11 standards, including IEEE 802.11ax and IEEE 802.11ac or other IEEE 802.11 standards. For example, the MAC layer 350 may generate an internal message 332 to inform the PHY layer 352 that an FTM service is to be requested. The PHY layer 352 of the user device 324 may extract information from the internal message, such as, destination information, origination information, network ID, etc.

A service request 334 may be generated by the PHY layer 352 of the user device 324 and sent to the AP 302 in order to notify the AP 302 of the FTM service request. The AP 302 may include, at least in part, a PHY layer 362, a MAC layer 364, and a lower power wake-up PHY layer 360. The PHY layer 362 of the AP 302 may receive the service request 334 and may extract information associated with the user device 324 and the requested service. For example, some of the information may include, but not limited to, service parameters, such as, service type and identification information associated with the user device 324. It is understood that the above descriptions are for purposes of illustration and are not meant to be limiting.

The PHY layer 362 of the AP 302 may communicate internally with the MAC layer 364 of the AP 302 using message 336 in order to process the service request 334 received from the user device 324. The message 336 may include, at least in part, the FTM parameters. In turn, the MAC layer 364 may generate a message 338 to notify the low power wake-up PHY layer 360 of the service request. The message 338 may include, at least in part, the service parameters. The message 338 may indicate to the low power wake-up PHY 360 layer that a wake-up message 340 may need to be generated. The low power wake-up PHY 360 layer may generate a wake-up message 340, such that the wake-up message 340 may include, at least in part, the service parameters that were extracted from the service request 334. The wake-up message 340 may be sent by the low power wake-up PHY 360. The wake-up message 340 may be an OOK modulate frame, using OOK modulation or may be a frame using ASK or PSK modulation. The wake-up message 340 may be received by the low power wake-up receiver PHY layer 354 of the relay device 304. The relay device 304 may have been in a dormant mode, where at least some of its components are powered off. For example, its IEEE 802.11 radio circuitry may be powered off. When the wake-up message is received by the low power wake-up receiver PHY layer 354, the low power wake-up receiver PHY layer 354 may generate a signal or internal message to instruct at least some of the components of the relay device 304 to transition from the dormant mode to an active mode. Consequently, the relay device 304 may then move from dormant to active mode. Internal message 342 may be sent from the PHY layer 354 to the MAC layer 358 of the relay device 304. Internal message 344 may be sent from the MAC layer 358 to the PHY layer 356. The relay device 304 may then generate a service message 346 at the PHY layer 356 and may send the service message 346 to the user device 324. The service message 346 may be a service establishment that may be a response to the service request 334 in order to perform the service requested by the user device 324. The service message 346 may be based at least in part on the service parameters that were extracted from the service request 334. The service message 346 may be received by the PHY layer 352 of the user device 324 and may be internally sent to the MAC layer 350 using internal message 348 in order to indicate to the user device 324 that a response to the service request 334 is received. The service may be then performed between the user device 324 and the relay device 304, even though the initial service request 334 was sent to the AP 302. The relay device 304 may act as an intermediary in a manner that is transparent to the user device 324 requesting the service. For example, the relay device 304 may use the same (or an assigned) MAC address of the AP 302, such that, the user device 324 is unaware it was moved to another device (e.g., relay device 304).

Figure 4:
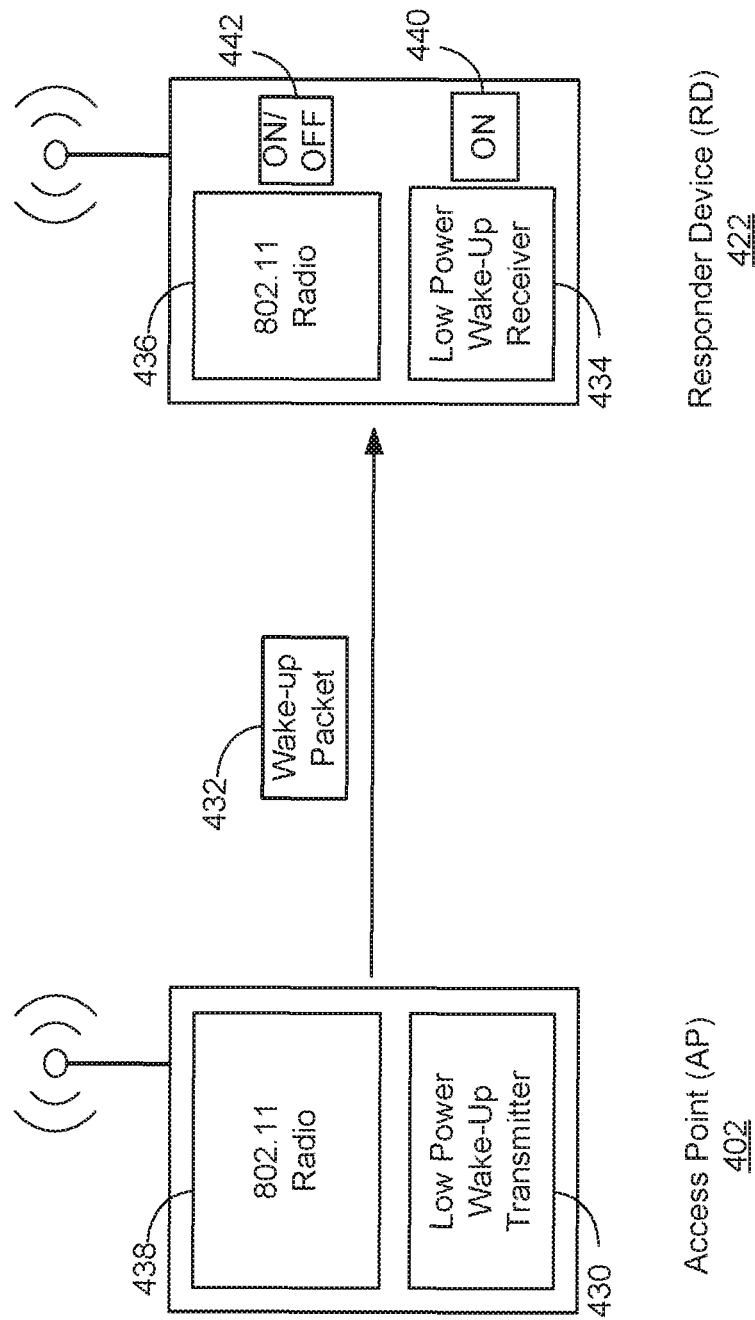
FIG. 4 depicts an illustrative schematic diagram of an LP-WUR for low power signaling, in accordance with one or more example embodiments of the present disclosure.

FIG. 4 depicts an illustrative schematic diagram of an LP-WUR for an FTM procedure, in accordance with one or more example embodiments of the present disclosure.

Referring to FIG. 4, there is shown a governing device 402 and a responding device 422 involved in an FTM service session utilizing a low-power wake-up signaling. The governing device 402 may utilize a low-power wake-up transmitter 430 to send a wake-up packet 432 to the low-power wake-up receiver (LP-WUR) 434 included in the responding device 422 during, for example, the FTM service session. It should be understood that although FIG. 4 shows that the governing device 402 contains a low-power wake-up transmitter, the governing device 402 may also contain an LP-WUR receiver in order to be able to receive a wake-up packet in case the governing device 402 is acting as a relay device or a responding device as opposed to a governing device. In that case, the governing device 402 may delegate its activities to the responding device 422. The governing device may then transition between a low-power mode and a high power mode based at least in part on receiving the wake-up packet from the responding device 422. Similarly, although the RD 422 is shown to have a low-power wake-up receiver (e.g., LP-WUR 434), the RD 422 may also contain a low-power wake-up transmitter in order to be able to send a wake-up packet in case the RD 422 is acting as a governing device. In that case, the RD 422 may send a wake-up packet to the responding device, in this case AP 402, in order to wake-up, one or more circuitries in the AP 402. It is understood that the above descriptions are for purposes of illustration and are not meant to be limiting.

The LP-WUR 434 may use simple modulation schemes such as on-off keying (OOK), amplitude shift keying (ASK) or frequency shift keying (FSK) for signaling. The LP-WUR 434 may use hardware and/or software components that may allow it to operate at a lower power consumption mode than a typical radio component (e.g., 802.11 devices 436 and 438).

The LP-WUR 434 may be constantly active (e.g., ON state 440) on the responding device 422 in order to receive a wake-up communication (e.g., wake-up packet 432) from the governing device 402. The governing device 402 may begin transmitting the wake-up packet 432 using a low-power communication method. The LP-WUR 434 may detect and/or decode the wake-up packet and may determine whether the wake-up packet is destined for the responding device 422. If the LP-WUR 434 (or other portions of the responding device 422) determines that the receiver address (RA) field of the MAC header from the wake-up packet 432 matches the address of the responding device 422, the LP-WUR 434 may then send a wake-up signal to the 802.11 radio 436 to power on (e.g. ON/OFF state 442) its circuitry.

The wake-up packet 432 may include timing information such as a wake-up period. The wake-up period may be a period of time that the responding device 422 may need to power its radio circuitry on/off. Following the wake-up period, the responding device 422 may power off some or all of its circuitry to reduce power consumption and preserve the life of its battery. The wake-up packet 432 may also include information to notify the responding device 422 when to send FTM assignment message to the user device in order to perform the FTM service based on the service request received from the user device. Although, the FTM service is given as an example, it is understood that other services may also be employed.

The low-power wake-up transmitter 430 may be a device on the governing device 402 that transmits a wake-up packet to other devices, e.g., the responding device 422. The low-power wake-up transmitter 430 may transmit at the same simple modulation schemes of the initiating device 422 (e.g., OOK, ASK, FSK, etc.). The low-power wake-up transmitter 430 may utilize signaling in order to generate and transmit the wake-up packet 432. This may allow, for example, an FTM procedure (or other service) to move from sending data to signaling, which may also provide advantages such as processing time on the governing device 402 and/or the responding device 422.

Figure 5A:
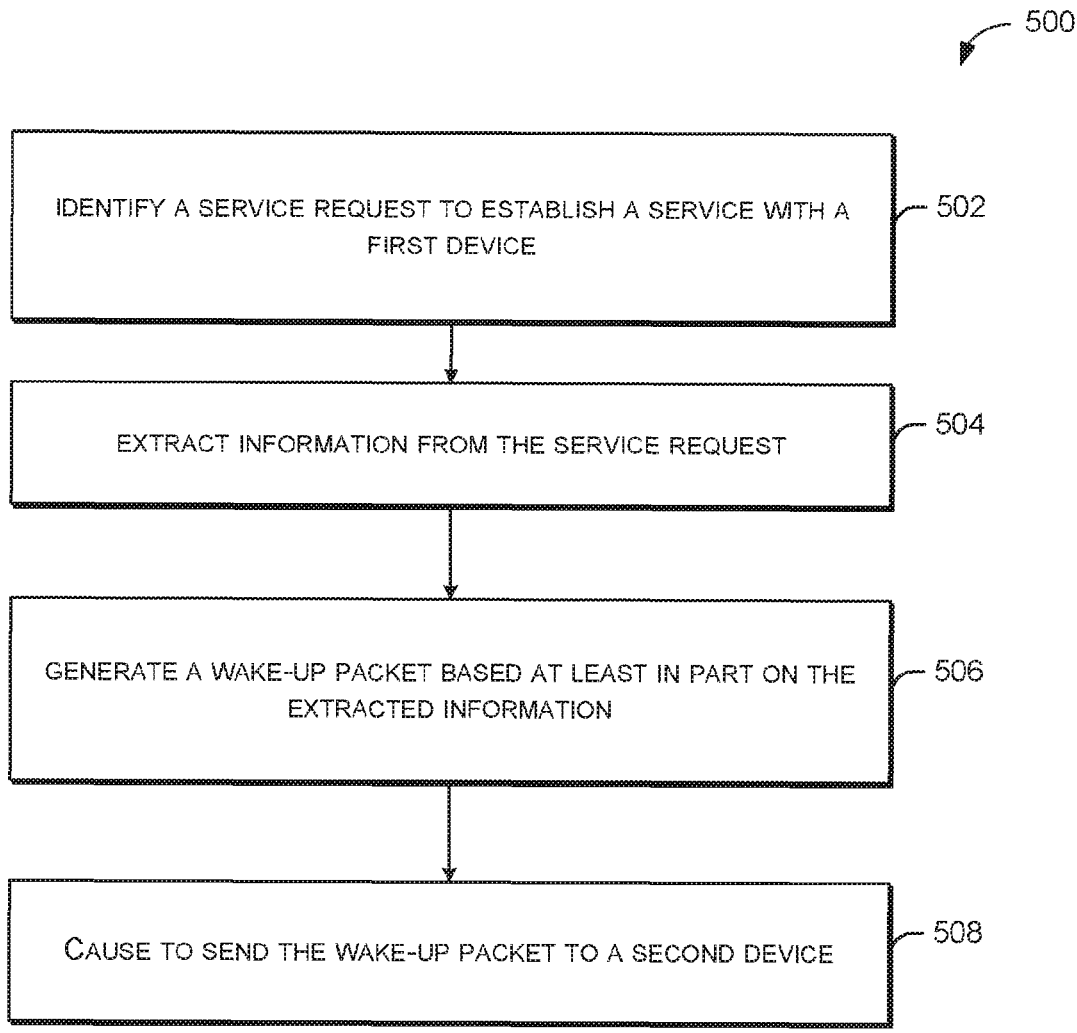
FIG. 5A depicts a flow diagram of an illustrative process for low power signaling, in accordance with one or more example embodiments of the present disclosure.

FIG. 5A illustrates a flow diagram of illustrative process 500 for low power signaling, in accordance with one or more embodiments of the disclosure.

At block 502, a device (e.g., user devices 120 and/or AP 102 and/or RD 104 of FIG. 1) may identify a service request to establish a service with a first device. The first device maybe a user device 120 that may request a service from an AP 102. The requested service may include, but not limited to, a data traffic service, a fine timing measurement (FTM) service. For example, the FTM service may be requested such that the user device 120 may want to determine its locations. In that case, the user device 120 may send an FTM request message to the AP 102 in order to perform an FTM procedure in or determine timing associated with multiple FTM frames that may be sent from the AP 102 to the user device 120. It is understood that the above descriptions are for purposes of illustration and are not meant to be limiting.

At block 504, the device that received the service request may extract information from the service request. For example, if the AP 102 received the service request, such as a request for an FTM service, the AP 102 may extract the information included in the service request. The extracted information may be FTM parameters that may include, but not limited to, burst time, burst period, and identification information associated with the user device 120.

At block 506, the AP 102 may generate a wake-up packet based at least in part on the extracted information. For example, a low power wake-up transmitter on the AP 102 may generate a wake-up packet, such that the wake-up packet may include, at least in part, the information that was extracted from the service request.

At block 508, the AP 102 may then send the wake-up packet to a responding device, which may act as an intermediary between the AP 102 and the user device 120. The responding device may include ad hoc APs or FTM responders. The responding device may include a low-power wake-up receiver (LP-WUR) in order to improve the power consumption by the responding device. After the LP-WUR receives the wake-up packet from the AP 102, the LP-WUR may extract information from the wake-up packet. In some examples, the wake-up packet may include timing information associated with the FTM session. For example, the wake-up packet may include a time when an FTM frame may be sent and/or received by the initiating device. In other examples, the wake-up packet may include timing information that may be associated with sending wake-up packets from the AP 102 to the responding device. The wake-up packet may also include instructions to wake-up radio circuitry of the responding device. That is, the wake-up may include an indication that the radio circuitry may need to be powered on in order to start receiving/sending data associated with the service request (e.g., FTM service request). If the radio circuitry is powered on, the responding device may be able to continue the communication with the user device 120 such that the spotting device may be transparent to the user device 120. This may be achieved by the responding device utilizing the same MAC address of the AP 102 such that the user device 120 may be unaware that its service request has been moved to the responding device. Afterwards, the responding device may perform additional messaging in order to complete the service request requested by the user device. In the case of an FTM service, the responding device may send, for example, an FTM assignment message that may establish the FTM procedure with the user device 120.

Figure 5B:
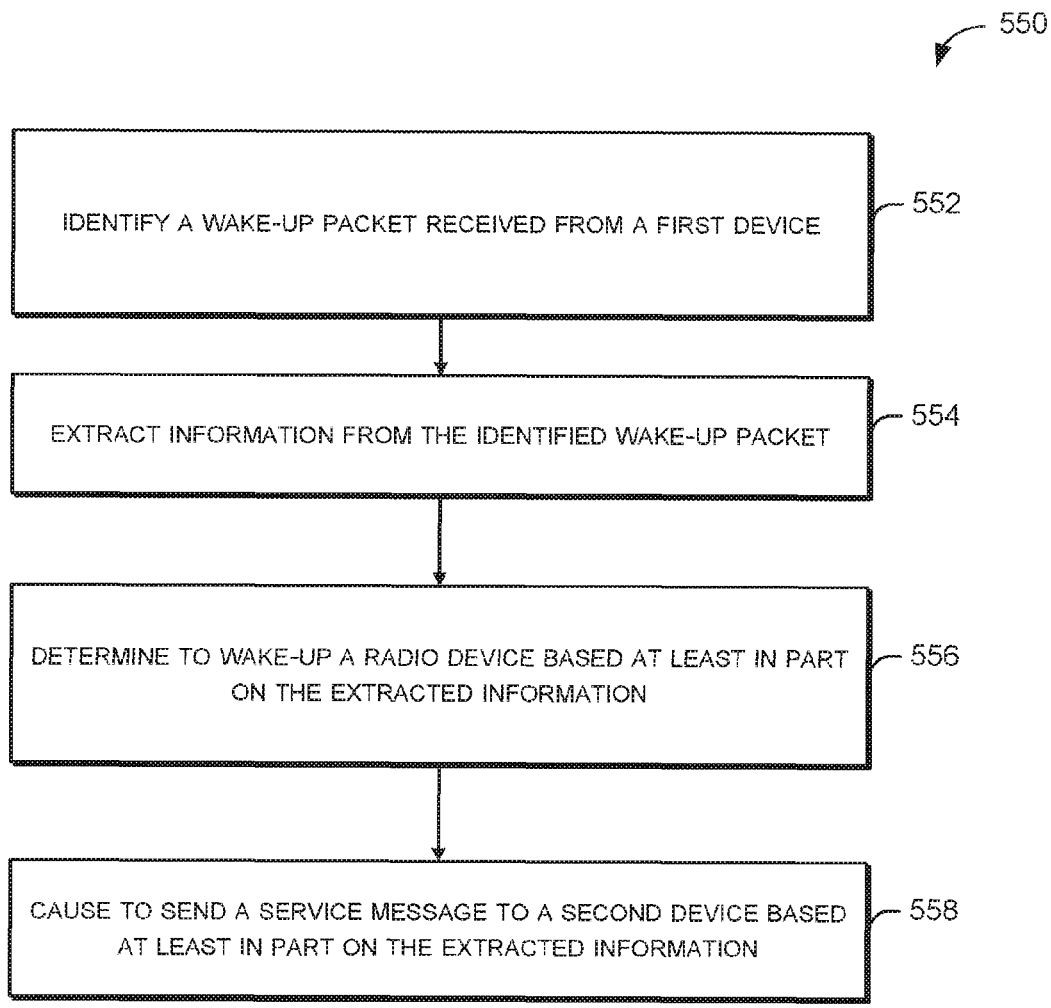
FIG. 5B depicts a flow diagram of an illustrative process for low power signaling, in accordance with one or more example embodiments of the present disclosure.

FIG. 5B illustrates a flow diagram of illustrative process 550 for low power signaling, in accordance with one or more embodiments of the disclosure.

At block 552, a device (e.g., user device 120, AP 102, RD 104 of FIG. 1) may identify a wake-up packet received from another device (e.g., user device 120, AP 102, RD 104 of FIG. 1). For example, an RD 104 may receive a wake-up packet from an AP 102. The wake-up packet being sent in response to a message that may be received from, for example, a user device 120. The user device 120 may have sent a service request to the AP 102 in order to establish a service with the AP 102. For example, a user device 120 may request an FTM service from AP 102 by sending an FTM service request to the AP 102. The AP 102 may then in turn generate a wake-up packet based at least in part on the service request received from the user device 120.

At block 554, the user device may extract information from the identified wake-up packet. The wake-up packet may include various information that may be useful in establishing the service with the user device and/or may include timing information associated with waking up radio circuitry associated with the RD 104. The RD 104 may extract this information in order to perform one or more actions based on what is included in the information. For example, the wake-up packet may include information about waking up a low-power wake-up receiver (LP-WUR) that may be included in the responding device. The LP-WUR may be used to generate a wake-up signal to components or devices that may be included in the RD 104 in order to power RD 104.

At block 556, the user device may determine to wake-up a radio device based at least in part on the extracted information. For example, a wake-up signal may be sent from the LP-WUR to radio circuitry or device on the RD 104 indicating to the radio circuitry or device to power up the radio circuitry or device. When the radio circuitry is awake or powered on, the radio circuitry may be able to perform communication with the user device 120. This may result in power consumption as the radio circuitry is only awake during times that the RD 104 may need to communicate with the user device 120.

At block 558, the user device may cause to send a service message to a user device 120 based at least in part on the extracted information. For example, the RD 104 may send an FTM assignment to start the FTM procedure. The FTM procedure is given here as an example. However, other procedures or services may be requested by the user device 120 and that may be serviced by the RD 104, such that the RD 104 is transparent to the user device 120. It is understood that the above descriptions are for purposes of illustration and are not meant to be limiting.

FIG. 6 shows a functional diagram of an exemplary communication station 600 in accordance with some embodiments. In one embodiment, FIG. 6 illustrates a functional block diagram of a communication station that may be suitable for use as an AP 102 (FIG. 1), an RD 104 (FIG. 1), or a user device 120 (FIG. 1) in accordance with some embodiments. The communication station 600 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The communication station 600 may include communications circuitry 602 and a transceiver 610 for transmitting and receiving signals to and from other communication stations using one or more antennas 601. The communications circuitry 602 may include circuitry that can operate the physical layer (PHY) communications and/or medium access control (MAC) communications for controlling access to the wireless medium, and/or any other communications layers for transmitting and receiving signals. The communication station 600 may also include processing circuitry 606 and memory 608 arranged to perform the operations described herein. In some embodiments, the communications circuitry 602 and the processing circuitry 606 may be configured to perform operations detailed in FIGS. 1, 2, 3, 4, 5A and 5B.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication station 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device that may be read-only memory (ROM), random-access memory (RAM), magnetic disk storage media, optical storage media, flash-memory devices and other storage devices and media.

In some embodiments, the communication station 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 600 may include one or more of a keyboard, a display, a non-volatile memory port, multiple antennas, a graphics processor, an application processor, speakers, and other mobile device elements. The display may be an LCD screen including a touch screen.

Although the communication station 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 600 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 600 may include one or more processors and may be configured with instructions stored on a computer-readable storage device memory.

FIG. 7 illustrates a block diagram of an example of a machine 700 or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environments. The machine 700 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718 (e.g., a speaker), a low power signaling device 719, a network interface device/transceiver 720 coupled to antenna(s) 730, and one or more sensors 728, such as a global positioning system (GPS) sensor, compass, accelerometer, or other sensor. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700.

In an example, one or any combination of the hardware processor 702, the main memory 704, the static memory 706, or the storage device 716 may constitute machine-readable media.

The low power signaling device 719 may carry out or perform any of the operations and processes (e.g., processes 500 and 550) described and shown above. For example, the low power signaling device 719 may be configured to utilize an LP-WUR. An LP-WUR may be used to transition into active or inactive mode, such as, powering one or more components of its circuitry on, only when needed and powering off during other times. During the active mode, a device may relay the data communication traffic to a governing device, while maintaining transparency with a user device requesting the data traffic service. When used for data traffic services the link conditions between governing device and the relay device may be known and static. In that case, the user device may be steered to use the relay device with better link budget than that of the governing device.

The low power signaling device 719 may be configured to include an LP-WUR in order to improve the power consumption by an FTM responder. For example, a user device may request an FTM session such that an FTM procedure may send one or more FTM frames to the user device in order to determine a range of the user device relative to at least the FTM responder based on timing measurements of the one or more FTM frames. Subsequently, location determination techniques, for example, triangulation, trilateration, etc., may be utilized based on the results of the FTM procedure in order to determine the location of the user device.

The low power signaling device 719 may be configured to utilize a wake-up packet to allow the FTM procedure (or a data traffic service) to move from sending data (sending data messages) to signaling (e.g., sending a wake-up packet). This may further provide advantages because signals may be processed by a low power receiver (e.g., LP-WUR) as opposed to the IEEE 802.11 receiver.

The low power signaling device 719 may be configured to receive an FTM request message at a governing device in order to establish the FTM session by a user device. The governing device may extract FTM parameters from the FTM request message. The FTM parameters may include, but not limited to, a burst time, a burst period, and identification information associated with the user device. The governing device may then utilize a low power wake-up transmitter within the governing device to send the FTM parameters to the FTM responder (or the ad hoc AP) using, for example, on-off keying (OOK) modulated frame (e.g., a wake-up frame or packet). Although OOK is discussed, other modulation techniques may be used, such as, amplitude shift keying (ASK) or frequency shift keying (FSK). In some examples, the wake-up packet may include timing information associated with the FTM session. For example, the wake-up packet may include a time when an FTM frame may be sent and/or received by the initiating device. In other examples, the wake-up packet may include an agreed and expected periodic reception of additional wake-up packets. Other timing information may include a time when the FTM responder may need to transition to an active or inactive mode (e.g., powering on or off one or more components in the FTM responder or the ad hoc AP).

The low power signaling device 719 may be configured to utilize the LP-WUR in the FTM responder (or the ad hoc AP) to receive the wake-up packet from the governing device. The LP-WUR integrated in the circuitry of the FTM responder (or the ad hoc AP) may be configured to receive the wake-up packet as an indication that the radio system of the FTM responder (or ad hoc AP) may need to be powered on in order to start receiving/sending data associated with the service request (e.g., FTM service request). The LP-WUR may be characterized with a much lower power consumption compared to a normal IEEE 802.11 OFDM receiver (e.g., IEEE 802.11 receiver). The governing device may include a wake-up packet transmitter that generates a wake-up packet to be transmitted to the FTM responder (or the ad hoc AP) during the FTM procedure, or other services.

The low power signaling device 719 may be configured to generate a wake-up signal to be sent to the one or more components that are in an active or dormant mode (e.g., powered off) on the FTM responder (or the ad hoc AP). The one or more inactive components may move from inactive to active mode by being powered on based on receiving the wake-up signal. Subsequently, the FTM responder (or ad hoc AP) may send an FTM assignment (or service establishment) and start the FTM process by sending the one or more FTM frames in the active mode.

The low power signaling device 719 may determine whether a received packet is larger than a predetermined packet size. The predetermined packet size may be based at least in part on spectral efficiency and/or or the medium. For example, if a the packet size is too large to be efficiently transmitted using a low power transmitter, the packet may be sent using another transmitter on the governing device. Low power signaling device 719 may be configured to send the wake-up packet to a relay device. The wake-up packet may indicate to the relay device that one or more of its circuitry need to transition from a low power mode to a high power mode. For example, the wake-up packet may indicate, at least in part, that the radio circuitry should power up in order to start communicating with the governing device and/or the user device. After the relay device is in a high power mode, the low power signaling device 719 may be configured to send the received packet that was determined to be larger than the predetermined packet size, to the relay device using a high power transmitter as opposed to the low power transmitter.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software. The operations and processes (e.g., processes 500 and 550) described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one-way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple-input multiple-output (MIMO) transceiver or device, a single-input multiple-output (SIMO) transceiver or device, a multiple-input single-output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

According to example embodiments of the disclosure, there may be a device. The device may include at least one memory that stores computer-executable instructions, and at least one processor configured to access the at least one memory, wherein the at least one processor is configured to execute the computer-executable instructions to identify a service request to establish a service with a first device. The at least one processor is configured to execute the computer-executable instructions to extract information from the service request. The at least one processor is configured to execute the computer-executable instructions to generate a wake-up packet based at least in part on the extracted information. The at least one processor is configured to execute the computer-executable instructions to cause to send the wake-up packet to a second device.

The implementations may include one or more of the following features. The at least one processor may be further configured to execute the computer-executable instructions to determine that the device is a governing device based at least in part on power consumption status. The at least one processor may be further configured to execute the computer-executable instructions to determine a size of a first packet received from the first device. The at least one processor may be further configured to execute the computer-executable instructions to determine to send the first packet using a first transmitter for a second transmitter based at least in part on the size of the first packet. The first transmitter is a low-power transmitter. The wake-up packet comprises, at least in part, timing information associated with waking up radio circuitry on the second device, and parameters associated with the service request. The timing information may include, at least in part, a start time for waking up the radio circuitry of the second device. The timing information may include, at least in part, a second time for placing the radio circuitry of the second device in a low power mode. The wake-up packet is received by a wake-up receiver on the second device. The at least one processor may be further configured to execute the computer-executable instructions to transition a radio device of the wake-up receiver of the second device to a high power mode, or transition the radio device to a low power mode based at least in part on the wake-up packets. The wake-up packet is compliant with at least one of an on-off keying (OOK) modulation scheme, an amplitude shift keying (ASK) modulation scheme, or a frequency shift keying (FSK). The device may further include a transceiver configured to transmit and receive wireless signals. The device may further include one or more antennas coupled to the transceiver.

According to example embodiments of the disclosure, there may be a non-transitory computer-readable medium storing computer-executable instructions which, when executed by a processor, cause the processor to perform operations. The operations may include identifying a wake-up packet received from a first device. The operations may include extracting information from the identified wake-up packet. The operations may include determining to wake-up a radio device based at least in part on the extracted information. The operations may include causing to send a service message to a second device based at least in part on the extracted information.

The implementations may include one or more of the following features. The operations for waking up the radio device further may include the operations for transitioning the radio device to a high power mode or transitioning the radio device to a low power mode. The extracted information is associated with a service request from a second device. The operations for identifying the wake-up packet received from the first device may include operations for identifying the wake-up packet received from an access point. The wake-up packet comprises, at least in part, timing information associated with transitioning the radio device to a high power mode, and parameters associated with the service message. The timing information include, at least in part, a start time for transitioning the radio device to a high power mode. The timing information include, at least in part, a second time for transitioning the radio device to a low power mode.

According to example embodiments of the disclosure, there may include a method. The method may include identifying a service request to establish a service with a first device. The method may include extracting information from the service request. The method may include generating a wake-up packet based at least in part on the extracted information. The method may include causing to send the wake-up packet to a second device.

The implementations may include one or more of the following features. The wake-up packet is compliant with at least one of an on-off keying (OOK) modulation scheme, an amplitude shift keying (ASK) modulation scheme, or a frequency shift keying (FSK). The method further comprises determining that the device is a governing device based at least in part on power consumption status. The method may include determining a size of a first packet received from the first device. The method may include determining to send the first packet using a first transmitter for a second transmitter based at least in part on the size of the first packet. The first transmitter is a low-power transmitter. The wake-up packet comprises, at least in part, timing information associated with waking up radio circuitry on the second device, and parameters associated with the service request. The timing information may include, at least in part, a start time for waking up the radio circuitry of the second device. The timing information may include, at least in part, a second time for placing the radio circuitry of the second device in a low power mode. The wake-up packet is received by a wake-up receiver on the second device. The method may include transitioning a radio device of the wake-up receiver of the second device to a high power mode, or transitioning the radio device to a low power mode based at least in part on the wake-up packets.

In example embodiments of the disclosure, there may be an apparatus. The apparatus may include means for identifying a service request to establish a service with a first device. The apparatus may include means for extracting information from the service request. The apparatus may include means for generating a wake-up packet based at least in part on the extracted information. The apparatus may include means for causing to send the wake-up packet to a second device.

The implementations may include one or more of the following features. The wake-up packet is compliant with at least one of an on-off keying (OOK) modulation scheme, an amplitude shift keying (ASK) modulation scheme, or a frequency shift keying (FSK). The means for determining that the device is a governing device is based at least in part on power consumption status. The apparatus may further comprise means for determining a size of a first packet received from the first device. The apparatus may include means for determining to send the first packet using a first transmitter for a second transmitter based at least in part on the size of the first packet. The first transmitter may be a low-power transmitter. The wake-up packet comprises, at least in part, timing information associated with means for waking up radio circuitry on the second device, and parameters associated with the service request. The timing information may include, at least in part, a start time for waking up the radio circuitry of the second device. The timing information may include, at least in part, a second time for placing the radio circuitry of the second device in a low power mode. The wake-up packet is received by a wake-up receiver on the second device. The apparatus may further include means for transitioning a radio device of the wake-up receiver of the second device to a high power mode, or means for transitioning the radio device to a low power mode based at least in part on the wake-up packets.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, comprising:
at least one memory that stores computer-executable instructions; and
at least one processor configured to access the at least one memory, wherein the at least one processor is configured to execute the computer-executable instructions to:
determine the device is a governing device and a second device is a relay device based on comparing one or more conditions to a first threshold;
identify a service request from a first device;
identify one or more parameters included in the service request, wherein the one or more parameters include identification information of the first device;
determine a wake-up packet to be sent to the second device using a low power transmitter of the governing device;
cause to send the wake-up packet to the second device to perform the service with the first device.

2. The device of claim 1, wherein the at least one processor is further configured to execute the computer-executable instructions to determine that the device is a governing device based at least in part on power consumption status.

3. The device of claim 1, wherein the at least one processor is further configured to execute the computer-executable instructions to:
determine a size of a first packet received from the first device; and determine to send the first packet using a first transmitter for a second transmitter based at least in part on the size of the first packet.

4. The device of claim 3, wherein the first transmitter is a low-power transmitter.

5. The device of claim 1, wherein the wake-up packet comprises, at least in part, timing information associated with waking up radio circuitry on the second device, and parameters associated with the service request.

6. The device of claim 5, wherein the timing information include, at least in part, a start time for waking up the radio circuitry of the second device.

7. The device of claim 5, wherein the timing information include, at least in part, a second time for placing the radio circuitry of the second device in a low power mode.

8. The device of claim 1, wherein the wake-up packet is received by a wake-up receiver on the second device.

9. The device of claim 8, wherein the at least one processor is further configured to execute the computer-executable instructions to transition a radio device of the wake-up receiver of the second device to a high power mode, or transition the radio device to a low power mode based at least in part on the wake-up packets.

10. The device of claim 1, wherein the wake-up packet is compliant with at least one of an on-off keying (OOK) modulation scheme, an amplitude shift keying (ASK) modulation scheme, or a frequency shift keying (FSK).

11. The device of claim 1, further comprising a transceiver configured to transmit and receive wireless signals.

12. The device of claim 11, further comprising one or more antennas coupled to the transceiver.

13. A non-transitory computer-readable medium storing computer-executable instructions which when executed by one or more processors result in performing operations comprising:
  determining, by a relay device, a first device is a governing device based on comparing one or more conditions to a first threshold;
  identifying a wake-up packet received from the governing device received on a low power transmitter;
  extracting information from the identified wake-up packet;
  determining to wake-up a radio device based at least in part on the extracted information; and
  identifying a service request received from the governing device;
  identifying one or more parameters included in the service request, wherein the one or more parameters include identification information of a client device requesting the service; and
  performing the service requested by the client device.

14. The non-transitory computer-readable medium of claim 13, wherein the operations for waking up the radio device further includes the operations for transitioning the radio device to a high power mode or transitioning the radio device to a low power mode.

15. The non-transitory computer-readable medium of claim 13, wherein the extracted information is associated with a service request from a second device.

16. The non-transitory computer-readable medium of claim 13, wherein the operations for identifying the wake-up packet received from the first device includes operations for identifying the wake-up packet received from an access point.

17. The non-transitory computer-readable medium of claim 13, wherein the wake-up packet comprises, at least in part, timing information associated with transitioning the radio device to a high power mode, and parameters associated with the service message.

18. The non-transitory computer-readable medium of claim 17, wherein the timing information include, at least in part, a start time for transitioning the radio device to a high power mode.

19. The non-transitory computer-readable medium of claim 17, wherein the timing information include, at least in part, a second time for transitioning the radio device to a low power mode.

20. A method comprising:
  determining a first device is a governing device and a second device is a relay device based on comparing one or more conditions to a first threshold;
  identify a service request from a client device;
  identifying one or more parameters included in the service request, wherein the one or more parameters include identification information of the client device;
  determining a wake-up packet to be sent to the second device using a low power transmitter of the governing device;
  causing to send the wake-up packet to the second device to perform the service with the client device.

21. The method of claim 20, wherein the wake-up packet is compliant with at least one of an on-off keying (OOK) modulation scheme, an amplitude shift keying (ASK) modulation scheme, or a frequency shift keying (FSK).

* * * * *